United States Patent
Shapira (10) Patent No.: US 9,882,593 B2
(45) Date of Patent: *Jan. 30, 2018

(54) COEXISTENCE BETWEEN PRIMARY CHAINS AND AUXILIARY RECEIVER CHAIN IN A WLAN DEVICE

(71) Applicant: Celeno Communications (Israel) Ltd., Raanana (IL)

(72) Inventor: Nir Shapira, Raanana (IL)

(73) Assignee: CELENO COMMUNICATIONS (ISRAEL) LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,121

(22) Filed: Dec. 25, 2014

(65) Prior Publication Data

US 2015/0110058 A1 Apr. 23, 2015

Related U.S. Application Data

(63) Continuation-in-part of application No. 14/278,117, filed on May 15, 2014.

(60) Provisional application No. 61/829,070, filed on May 30, 2013.

(51) Int. Cl.
*H04W 4/00* (2009.01)
*H04B 1/3805* (2015.01)
*H04W 88/06* (2009.01)

(52) U.S. Cl.
CPC .......... *H04B 1/3805* (2013.01); *H04W 88/06* (2013.01)

(58) Field of Classification Search
CPC ..... H04L 5/001; H04B 1/0475; H04B 1/1027; H04B 1/525; H04W 24/02; H04W 28/18
See application file for complete search history.

(56) References Cited

U.S. PATENT DOCUMENTS

| 6,029,052 A | * | 2/2000 | Isberg ..................... H03J 5/244 455/131 |
| 6,047,175 A | | 4/2000 | Trompower |
| 6,944,427 B2 | | 9/2005 | Haub et al. |

(Continued)

FOREIGN PATENT DOCUMENTS

WO 2006105547 A1 10/2006

OTHER PUBLICATIONS

U.S. Appl. No. 14/278,117 Office Action dated Apr. 28, 2016.
(Continued)

*Primary Examiner* — Asad Nawaz
*Assistant Examiner* — Berhanu Belete
(74) *Attorney, Agent, or Firm* — D. Kligler IP Services Ltd.

(57) ABSTRACT

A method includes, in a Wireless Local Area Network (WLAN) device that includes one or more primary transmission/reception (TX/RX) chains and an auxiliary reception (RX) chain, defining a first operational mode in which priority is given to transmission of the primary TX/RX chains, and a second operational mode in which the priority is given to reception of the auxiliary RX chain. communication is performed on a given communication channel using the primary TX/RX chains, and evaluation of signal activity is performed on one or more alternative communication channels using the auxiliary reception (RX) chain, while operating the WLAN device alternately in the first and second operational modes.

24 Claims, 2 Drawing Sheets

(56) References Cited

U.S. PATENT DOCUMENTS

| | | | | |
|---|---|---|---|---|
| 7,463,704 | B1* | 12/2008 | Tehrani | H03G 3/3068 375/267 |
| 7,830,854 | B1 | 11/2010 | Sarkar et al. | |
| 8,249,031 | B1* | 8/2012 | Hirsch | H04W 72/1215 370/336 |
| 8,406,274 | B1* | 3/2013 | Hirsch | H03G 3/3078 375/133 |
| 8,442,016 | B1 | 5/2013 | Lee et al. | |
| 8,520,586 | B1* | 8/2013 | Husted | H04W 74/08 370/318 |
| 8,565,112 | B2* | 10/2013 | Peiris | H04M 1/7253 370/252 |
| 8,660,105 | B2 | 2/2014 | Li et al. | |
| 9,226,174 | B2 | 12/2015 | Mucke | |
| 9,307,538 | B2 | 4/2016 | Noh et al. | |
| 9,380,348 | B2* | 6/2016 | Ling | H04N 21/6118 |
| 2002/0126767 | A1* | 9/2002 | Ding | H03F 1/3211 375/296 |
| 2002/0177465 | A1 | 11/2002 | Robinett | |
| 2003/0017833 | A1 | 1/2003 | Forrester | |
| 2003/0181181 | A1 | 9/2003 | Darabi | |
| 2004/0103204 | A1* | 5/2004 | Yegin | H04W 88/06 709/229 |
| 2004/0156336 | A1* | 8/2004 | McFarland | H04L 1/22 370/329 |
| 2005/0059363 | A1 | 3/2005 | Hansen | |
| 2005/0068900 | A1 | 3/2005 | Stephens et al. | |
| 2005/0180314 | A1* | 8/2005 | Webster | H04L 5/023 370/208 |
| 2005/0245192 | A1 | 11/2005 | Karabinis | |
| 2006/0063484 | A1* | 3/2006 | Proctor, Jr. | H04B 7/15542 455/7 |
| 2006/0160564 | A1 | 7/2006 | Beamish et al. | |
| 2006/0205443 | A1* | 9/2006 | Simoens | H04L 1/0003 455/574 |
| 2006/0214738 | A1* | 9/2006 | Sheng | H03B 5/36 331/36 C |
| 2006/0218417 | A1* | 9/2006 | Sheng | G06F 1/04 713/300 |
| 2006/0221914 | A1 | 10/2006 | Waxman | |
| 2006/0223450 | A1* | 10/2006 | Dacosta | H04B 1/005 455/73 |
| 2007/0058739 | A1* | 3/2007 | Aytur | H03G 3/3068 375/260 |
| 2007/0139105 | A1 | 6/2007 | Kennan | |
| 2007/0207751 | A1* | 9/2007 | Behzad | H04B 1/406 455/132 |
| 2007/0275669 | A1* | 11/2007 | Rietman | H04W 28/06 455/70 |
| 2008/0080446 | A1 | 4/2008 | Chung | |
| 2008/0139151 | A1 | 6/2008 | Ojo et al. | |
| 2008/0227405 | A1* | 9/2008 | Harel | H04B 7/063 455/69 |
| 2008/0293368 | A1* | 11/2008 | Desai | H04B 7/0691 455/138 |
| 2009/0080388 | A1 | 3/2009 | Rohfleisch et al. | |
| 2009/0170578 | A1* | 7/2009 | Richey | H04B 1/3805 455/701 |
| 2009/0323652 | A1* | 12/2009 | Chen | H04B 1/406 370/338 |
| 2010/0210299 | A1* | 8/2010 | Gorbachov | H04B 1/406 455/552.1 |
| 2010/0278117 | A1* | 11/2010 | Sharma | H04W 36/06 370/329 |
| 2010/0303183 | A1 | 12/2010 | Desai | |
| 2010/0322354 | A1* | 12/2010 | Tanimoto | H04B 1/74 375/340 |
| 2011/0222519 | A1 | 9/2011 | Liao et al. | |
| 2011/0292919 | A1 | 12/2011 | Trainin et al. | |
| 2012/0213086 | A1 | 8/2012 | Matsuura | |
| 2012/0258749 | A1* | 10/2012 | Lenzini | H04W 16/14 455/509 |
| 2012/0275354 | A1* | 11/2012 | Villain | H04L 27/0006 370/281 |
| 2012/0302155 | A1* | 11/2012 | Marsolais | H04K 1/003 455/1 |
| 2013/0196673 | A1 | 8/2013 | Smadi | |
| 2013/0288624 | A1 | 10/2013 | Mujtaba et al. | |
| 2013/0329586 | A1* | 12/2013 | Mucke | H04W 24/02 370/252 |
| 2013/0329821 | A1 | 12/2013 | Chen et al. | |
| 2014/0233679 | A1 | 8/2014 | Rajagopal et al. | |
| 2014/0245059 | A1* | 8/2014 | Ling | H04N 21/6118 714/4.2 |
| 2014/0341043 | A1 | 11/2014 | Prydekker et al. | |
| 2014/0355532 | A1 | 12/2014 | Shapira | |
| 2015/0003636 | A1 | 1/2015 | Shapira | |

OTHER PUBLICATIONS

U.S. Appl. No. 14/485,735 Office Action dated Apr. 8, 2016.

IEEE Standard 802.11n, IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput, Sections 9.19 and 20.3.12, Oct. 29, 2009.

International Application # PCT/IB2014/061531 Search Report dated Aug. 20, 2014.

IEEE Standard 802.11ac, "IEEE Standard for Information technology—Telecommunications and information exchange between systems Local and metropolitan area networks—Specific requirements, Part 11: Wireless LAN Medium Access Control(MAC) and Physical Layer (PHY) Specifications; Amendment 4: Enhancements for Very High Throughput for Operation in Bands below 6 GHz", 425 pages, Dec. 11, 2013.

IEEE 802.11k, "IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 1: Radio Resource Measurement of Wireless LANs", sections 11.10.8.3-11.10.8.4, Jun. 12, 2008.

ETSI Standard EN 301 893, "Broadband Radio Access Networks (BRAN);5 GHz high performance RLAN;Harmonized EN covering the essential requirements of article 3.2 of the R&TTE Directive", version 1.7.1, section 4.7, Jun. 30, 2012.

Brik et al., "Eliminating handoff latencies in 802.11 WLANs using Multiple Radios:Applications, Experience, and Evaluation", Proceedings of the 5th Conference on Internet Measurement, pp. 299-304, Oct. 31, 2005.

Briggs et al., "Dynamic Frequency Selection (DFS) and the 5GHz Unlicensed Band", Elliott Laboratories—An NTS Company, 11 pages, Nov. 20, 2009.

IEEE Std 802.11b, "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications:Higher-Speed Physical Layer Extension in the 2.4 GHz Band", 96 pages, Sep. 16, 1999.

IEEE 802.11g, "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 4: Further Higher Data Rate Extension in the 2.4 GHz Band", 78 pages, Jun. 27, 2003.

U.S. Appl. No. 14/278,117 Office Action dated Nov. 4, 2015.

European Application # 15165810.1 Search Report dated Oct. 19, 2015.

U.S. Appl. No. 14/485,735 office Action dated Sep. 9, 2016.

U.S. Appl. No. 14/278,117 office Action dated Oct. 6, 2016.

Orfanos et al., "Development and Performance Evaluation of an Adaptive MAC Protocol for MC-CDMA Wireless LANs with QoS (56) References Cited

OTHER PUBLICATIONS

Support", Department of Communication Networks (ComNets), Internet citation, pp. 43-70, Jun. 19, 2006 (http://www.comnets.rwth-aachen.de/publications/complete-lists/abstracts/2006/diss-orfanos-2006.html).
U.S. Appl. No. 14/278,117 Office Action dated Apr. 20, 2017.
U.S. Appl. No. 14/485,735 Office Action dated Sep. 20, 2017.

* cited by examiner

COEXISTENCE BETWEEN PRIMARY CHAINS AND AUXILIARY RECEIVER CHAIN IN A WLAN DEVICE

CROSS-REFERENCE TO RELATED APPLICATIONS

This application in a continuation-in-part of U.S. patent application Ser. No. 14/278,117, filed May 15, 2014, which claims the benefit of U.S. Provisional Patent Application 61/829,070, filed May 30, 2013. The disclosures of these related applications are incorporated herein by reference.

FIELD OF THE INVENTION

The present invention relates generally to wireless communication, and particularly to methods and systems for reception in Wireless Local Area Network (WLAN) devices.

BACKGROUND OF THE INVENTION

A Wireless Local-Area Network (WLAN) typically comprises one or more Access Points (APs) that communicate with stations (STAs). WLAN communication protocols are specified, for example, in the IEEE 802.11 family of standards, such as in the 802.11n-2009 standard entitled "IEEE Standard for Information technology—Local and metropolitan area networks—Specific requirements—Part 11: Wireless LAN Medium Access Control (MAC) and Physical Layer (PHY) Specifications Amendment 5: Enhancements for Higher Throughput," 2009; in the 802.11ac-2013 standard entitled "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz," 2013; and in the IEEE 802.11k-2008 standard entitled "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 1: Radio Resource Measurement of Wireless LANs," 2008, which are incorporated herein by reference. WLANs are also commonly referred to as Wi-Fi networks.

SUMMARY OF THE INVENTION

An embodiment of the present invention that is described herein provides a method including, in a Wireless Local Area Network (WLAN) device that includes one or more primary transmission/reception (TX/RX) chains and an auxiliary reception (RX) chain, defining a first operational mode in which priority is given to transmission of the primary TX/RX chains, and a second operational mode in which the priority is given to reception of the auxiliary RX chain. communication is performed on a given communication channel using the primary TX/RX chains, and evaluation of signal activity is performed on one or more alternative communication channels using the auxiliary reception (RX) chain, while operating the WLAN device alternately in the first and second operational modes.

In some embodiments, communicating using the primary TX/RX chains includes alternating between transmission and reception in the primary TX/RX chains in any of the first and second operational modes. In an embodiment, operating in the first operational mode includes deactivating at least part of the auxiliary RX chain during transmission of the primary TX/RX chains. In another embodiment, operating in the second operational mode includes limiting a duty cycle of the transmission of the primary TX/RX chains so as not to exceed a predefined ratio.

In yet another embodiment, operating in the second operational mode includes transmitting using only a partial subset of the primary TX/RX chains that are able to coexist with reception of the auxiliary RX chain. In still another embodiment, operating in the second operational mode includes constraining a transmission power of at least one of the primary TX/RX chains to a level that permits coexistence with reception of the auxiliary RX chain.

In some embodiments, the method includes operating in the first operational mode as long as no interference is detected, and switching to the second operational mode in response to detecting the interference. In an embodiment, at least a Low-Noise Amplifier (LNA) of the auxiliary RX chain is partially shared with one of the primary TX/RX chains.

In some embodiments, evaluating the signal activity includes verifying whether radar signals are present on the alternative communication channels. Additionally or alternatively, evaluating the signal activity may include carrying out an off-channel Channel Availability Check (CAC) or In-Service Monitoring (ISM) process. Carrying out the CAC or ISM process may include monitoring a given alternative channel for at least a specified time period, and the method may include excluding time periods during which the auxiliary RX chain is deactivated from a count of the specified time period.

Further additionally or alternatively, evaluating the signal activity may include collecting respective statistical data that characterize an extent of the signal activity on one or more of the alternative communication channels. In an embodiment, evaluating the signal activity includes assessing respective signal duty-cycles on the alternative communication channels.

There is additionally provided, in accordance with an embodiment of the present invention, a Wireless Local Area Network (WLAN) device including one or more primary transmission/reception (TX/RX) chains, an auxiliary reception (RX) chain and a control unit. The control unit is configured to communicate on a given communication channel using the primary TX/RX chains and to evaluate signal activity on one or more alternative communication channels using the auxiliary reception (RX) chain, while operating alternately in a first operational mode in which priority is given to transmission of the primary TX/RX chains, and in a second operational mode in which the priority is given to reception of the auxiliary RX chain.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for WLAN communication. In the disclosed embodiments, a WLAN device (which may serve as an AP or STA) comprises one or more primary transmission/reception (TX/RX) chains for conducting WLAN communication with a remote WLAN device on a given communication channel, referred to as a primary channel. In addition, the WLAN device comprises an auxiliary reception RX chain that is configured to detect signals and evaluate signal activity on alternative communication channels.

In some embodiments, the auxiliary RX chain is used for identifying alternative channels that the WLAN device may choose to switch to if necessary. Evaluation of alternative channels may involve, for example, verifying that an alternative channel is free of radar signals, or mapping the signal activity across the band in order to find interference-free channels. In other embodiments, the auxiliary RX chain is used for collecting statistical signal activity data on alternative channels, e.g., for reporting purposes.

In some embodiments that are described herein, a control unit in the WLAN device employs mechanisms for ensuring coexistence between the primary TX/RX chains and the auxiliary RX chain. The coexistence mechanisms described herein mitigate the possible effects of signal leakage from the primary-chain transmitters to the auxiliary-chain receiver.

Several coexistence techniques are described herein. Generally speaking, in the disclosed technique the WLAN device alternates between two operational modes. In the first mode, priority is given to the primary TX/RX chains while possibly degrading or compromising reception performance of the auxiliary RX chain. In the second mode, priority is given to the auxiliary RX chain, while permitting degradation in primary-chain performance. The two modes do not necessarily correspond to transmission and reception intervals of the primary TX/RX chains, i.e., the primary chains may alternate between transmission and reception in either of the modes. In some embodiments, although not necessarily, the WLAN device operates by default in the first mode, and switches to the second mode in response to detecting interference on the primary channel.

In some embodiments, the control unit deactivates the auxiliary RX chain during transmission intervals of the primary TX/RX chains. To compensate for the deactivation periods of the auxiliary RX chain, the control unit may prolong the end-to-end alternative channel evaluation time, and/or limit the maximum transmission duty cycle of the primary TX/RX chains.

In other embodiments, the control unit operates the auxiliary RX chain continuously, and mitigates leakage by transmitting via only a subset of the TX/RX chains and/or reducing the transmit power of one or more of the primary TX/RX chains. These modes of operation may be invoked, for example, in response to detecting interference on the primary channel.

The coexistence techniques described herein balance between the need to allow the auxiliary RX chain sufficient time to evaluate alternative channels, and the requirement to provide seamless service by the primary TX/RX chains on the primary channel. When using these techniques, the WLAN device is able to parallelize the evaluation of alternative channels and normal operation on the primary channel, in spite of real-life signal leakage from the primary TX/RX chains to the auxiliary RX chain.

System Description

Figure 1:
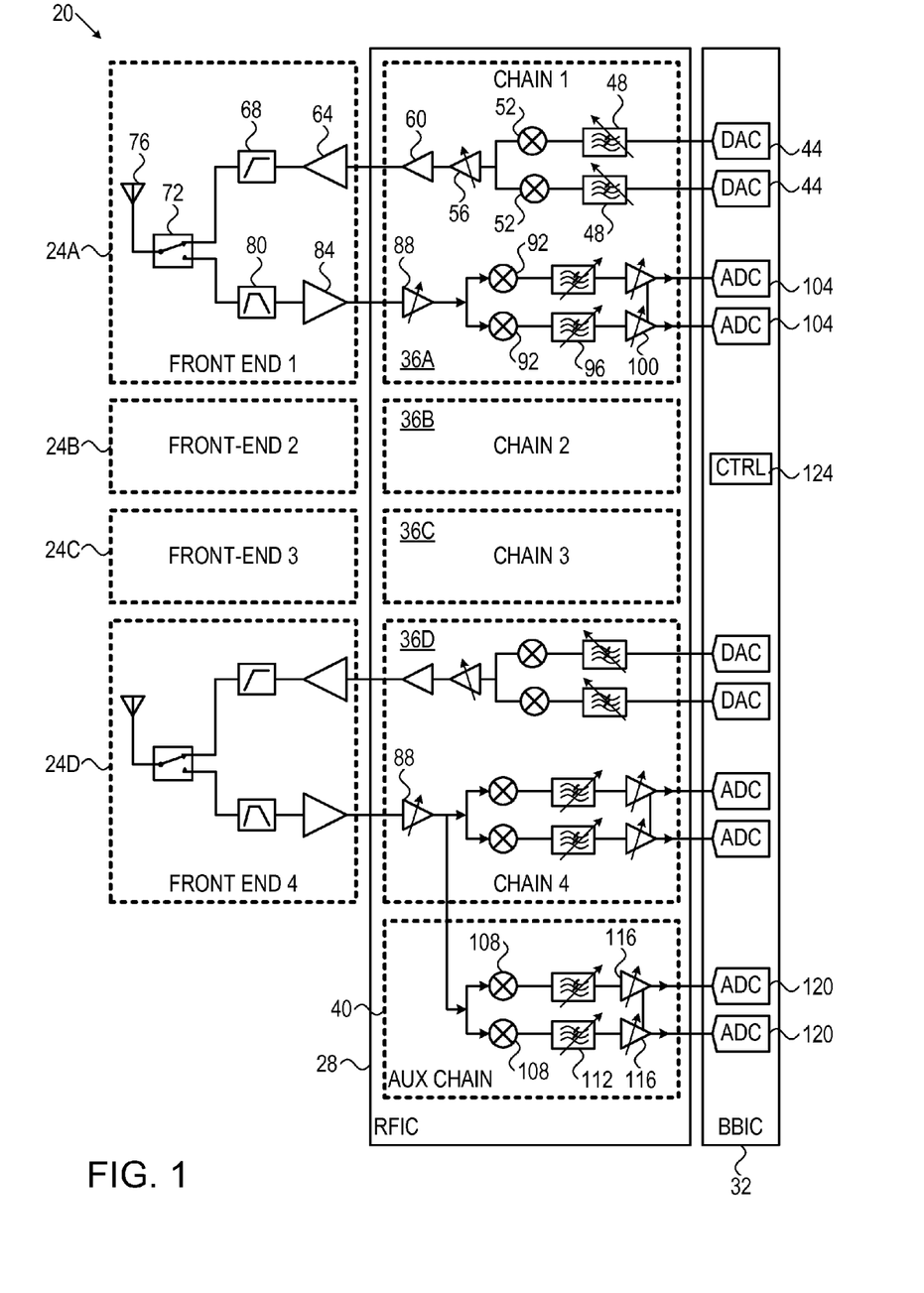
FIG. 1 is a block diagram that schematically illustrates a WLAN device, in accordance with an embodiment of the present invention.

FIG. 1 is a block diagram that schematically illustrates a WLAN device 20, in accordance with an embodiment of the present invention. Device 20 may operate as a WLAN Access Point (AP) or as a WLAN station (STA). Device 20 is configured to communicate with remote WLAN devices in accordance with a WLAN standard such as the IEEE 802.11 standards, cited above.

In the present example, device 20 transmits and receives WLAN signals using four transmission/reception (TX/RX) chains, also referred to as primary chains. The four TX/RX chains comprise four respective front-ends 24A . . . 24D and four respective Radio Frequency (RF) chains 36A . . . 36D. RF chains 36A . . . 36D are comprised in an RF Integrated Circuit (RFIC) 28. Baseband processing of the transmitted and received signals is performed in a Baseband Integrated Circuit (BBIC) 32.

BBIC 32 also comprises a control unit 124, which controls and manages the operation of device 20. Among other tasks, control unit 124 handles the coexistence between the primary chains and the auxiliary chain, as will be explained in detail below.

In each TX/RX chain, the transmit path begins in BBIC 32, which generates a digital baseband signal for transmission. A pair of Digital to Analog Converters (DACs) 44 convert the digital baseband signal into an analog signal. In the corresponding RF chain, a pair of Band-Pass Filters (BPFs) 48 filter the analog signal, a pair of mixers 52 up-convert the signal to RF, and amplifiers 56 and 60 amplify the RF signal. In the respective front-end, a Power Amplifier (PA) 64 amplifies the RF signal. The signal is then filtered with a Low-Pass Filter (LPF) 68, and provided via a TX/RX switch 72 to an antenna 76.

In the receive path of each TX/RX chain, antenna 76 receives an RF signal, and the signal passes through switch 72 and is filtered by a filter 80. A Low-Noise Amplifier (LNA) 84, referred to as an external LNA, amplifiers the signal before providing it to the corresponding RF chain in RFIC 28. In the RFIC, the signal is amplified by an additional LNA 88, referred to as an internal LNA. A pair of mixers 92 down-convert the RF signal to baseband, a pair of baseband filters 96 filter the down-converted signal, and the signal is then amplified by a pair of Variable-Gain Amplifiers (VGAs) 100. The baseband signal is then provided to BBIC 32, where it is converted into a digital signal by a pair of Analog-to-Digital Converters (ADCs) 104. The BBIC then proceeds to demodulate the digital signal. In a WLAN, the signal may comprise, for example, an Orthogonal Frequency Division Multiplexing (OFDM) signal.

The four TX/RX chains of device 20 are typically tuned to the same communication channel, so as to support various diversity or Multiple-Input Multiple-Output (MIMO) schemes. Thus, mixers 92 in the four RF chains 36A . . . 36D are typically driven with the same Local Oscillator (LO) frequency. The channel frequency on which the four TX/RX chains communicate is denoted frequency A, and the corresponding LO signal is typically generated in a single synthesizer (or other frequency source, not shown in the figure).

In each TX/RX chain, LNA 88 and VGAs 100 have variable gains, which are typically controlled by control unit 124 as part of an Automatic Gain Control (AGC) mechanism. In an example implementation, the AGC mechanism may set the gains of LNA 88 and VGAs 100 such that LNA 84, LNA 88 and ADCs 104 do not saturate.

In addition to the four primary TX/RX chains, device further comprises an auxiliary reception (RX) chain 40. Auxiliary chain 40 is typically used for analyzing signal activity on alternative communication channels. The signal activity evaluation can be used, for example, for identifying alternative channels that device 20 may later choose to switch to, or for collecting statistical activity data. (Throughout the present patent application, the terms "channels," "frequency channels" and "communication channels" are used interchangeably.) In example embodiments, chain 40 is used for verifying that an alternative channel is free of radar signals, or free of interference in general. The use of auxiliary chain 40 is addressed in greater detail below.

In the example of FIG. 1, auxiliary chain 40 shares the antenna, the front-end and also the internal LNA of one of the primary TX/RX chains. In other words, the input to auxiliary chain 40 is the RF signal produced by internal LNA 88 of one of the primary TX/RX chains. A pair of mixers 108 down-convert this RF signal to baseband, a pair of baseband filters 112 filter the down-converted signal, and the signal is then amplified by a pair of Variable-Gain Amplifiers (VGAs) 116. The baseband signal of the auxiliary chain is provided to BBIC 32, where it is converted into a digital signal by a pair of Analog-to-Digital Converters (ADCs) 120.

Auxiliary chain 40 is typically used for analyzing alternative channels while the other TX/RX chains communicate on frequency A. The frequency on which the auxiliary chain receives at a given time is denoted frequency B. The corresponding LO signal, for driving mixers 108, is typically generated by an additional synthesizer (or other frequency source, different from the frequency source that drives mixers 92).

In some embodiments, the additional synthesizer used for the auxiliary chain may be designed for lower performance (and thus lower cost) than that of the synthesizer of the primary chains. For example, auxiliary chain 40 is typically used only for signal detection rather than demodulation, whereas the primary chains are used for signal demodulation. As such, the performance requirements from auxiliary chain 40 are typically more relaxed than the performance requirements from the primary chains. This relaxation enables the auxiliary chain to be implemented with lower cost. (Following the same rationale, other components of the auxiliary chain, such as mixers 108 or analog front-end components, may be designed with relaxed performance relative to the corresponding components in the primary chains.)

In some embodiments, device 20 already comprises a second synthesizer for some other operating mode or purpose. In such an embodiment, the existing second synthesizer can be re-used for driving the auxiliary chain, further minimizing the added cost, size and power consumption.

The configuration of WLAN device 20 shown in FIG. 1 is an example configuration, which is chosen purely for the sake of conceptual clarity. In alternative embodiments, any other suitable device configuration can be used. For example, device 20 may comprise any suitable number of TX/RX chains, or even a single chain. The various reception and transmission paths in device 20 of FIG. 1 are implemented in an In-Phase/Quadrature (I/Q) configuration. Alternatively, some or all of the reception and/or transmission paths may be implemented using zero IF configuration with a single real BB signal.

The division of functions among the front-ends, RFIC or BBIC may differ from the division shown in FIG. 1. The RFIC and BBIC may be integrated in a single device (e.g., on a single silicon die) or implemented in separate devices (e.g., separate silicon dies). Further alternatively, the entire functionality of the front ends may be implemented in the RFIC, or device 20 may be implemented without an RFIC. In the front-ends, filter 80 may be inserted after LNA 84 rather than before the LNA. In other configurations filter 80 and/or LNA 84 may be omitted.

The different elements of device 20 may be implemented using suitable hardware, such as in one or more RFICs, Application-Specific Integrated Circuits (ASICs) or Field-Programmable Gate Arrays (FPGAs). In some embodiments, some elements of device 20, e.g., control unit 124, can be implemented using software, or using a combination of hardware and software elements. Elements of device 20 that are not mandatory for understanding of the disclosed techniques have been omitted from the figure for the sake of clarity.

In some embodiments, control unit 124 is implemented using a general-purpose processor, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. This processor may be internal or external to the BBIC.

In some frequency bands, e.g., in part of the 5 GHz band, regulatory requirements specify that WLAN device 20 must detect the presence of radar signals and, if detected, switch to a different channel. Such channels are referred to as Dynamic Frequency Selection (DFS) channels. This requirement holds both before and during communication.

Before starting communication on a given channel, device 20 is required to verify that the channel is free of radar signals for at least sixty seconds. This mechanism is referred to as Channel Availability Check (CAC). In addition, device 20 is required to check for radar signals during normal communication, and switch to a different channel if a radar signal appears on the currently-used channel. This mechanism is referred to as In-Service Monitoring (ISM).

The CAC and ISM mechanisms are specified, for example, in ETSI Standard EN 301 893 entitled "Broadband Radio Access Networks (BRAN); 5 GHz high performance RLAN; Harmonized EN covering the essential requirements of article 3.2 of the R&TTE Directive," version 1.7.0, January, 2012, which is incorporated herein by reference. Section 4.7 of this standard addresses DFS operation, including avoidance of co-channel operation with radar systems. Section 4.7.2.2 specifies an off-channel CAC mechanism that monitors channels different from the operating channel for the presence of radar signals.

In some embodiments, control unit 124 uses auxiliary chain 40 to evaluate alternative communication channels for the presence/absence of radar signals, concurrently with the normal communication of device 20 using the four primary TX/RX chains. In an example embodiment, device 20 communicates (e.g., actively communicating with a remote device or waiting for remote devices to associate) using the primary TX/RX chains (on frequency A). In parallel, control unit 124 instructs auxiliary chain 40 to tune to one or more alternative channels (on different frequencies denoted B), and attempt to detect the presence of a radar signal.

Using this mechanism, device 20 is able to switch to an alternative channel immediately if a radar signal appears on frequency A, without having to wait for sixty seconds in order to verify that the alternative channel is clear. In an embodiment, this mechanism enables device 20 to implement off-channel CAC (specified in EN 301 893, cited above) efficiently and without disruption to normal operation.

Radar signal detection using auxiliary chain 40 is also useful in scenarios in which device 20 operates alternately on two frequency channels, with a certain duty cycle. This sort of scenario occurs, for example, in "WiFi Direct" operation, in which device 20 is associated with an Access Point (AP) on frequency A and at the same time conducts a "WiFi direct" session on frequency B. Typically, device 20 would toggle between frequencies A and B. However, if frequency B is a DFS channel, device is not permitted to start operating on this channel immediately. In an embodiment, auxiliary chain 40 continuously monitors frequency B for radar signals, and thus allows uninterrupted toggling between the channels.

Additionally or alternatively, device 20 may use auxiliary chain 40 to map the signal activity across the different channels of the operating band, in parallel with the normal operation conducted using the primary chains. This mapping can later be used, for example, for selecting an alternative channel for device 20 to switch to. In particular, the activity mapping can be used for identifying alternative channels that are free (or at least relatively free) of interference.

Another possible use of signal activity mapping is for reporting purposes, for example in order to implement the IEEE 802.11k-2008 standard, cited above. In a typical activity mapping scheme, device 20 uses auxiliary chain 40 to collect statistical information that characterizes the extent of signal activity on one or more alternative channels. Such information may comprise, for example, statistics of signal duty cycle and/or signal power level per alternative channel.

In some embodiments, device 20 uses auxiliary chain to measure the power and time duration of RF energy pulse events, per channel. A pulse event may be indicative, for example, of a transmitted communication frame. In some embodiments, device 20 uses the auxiliary chain to construct an energy/activity histogram profile per channel. Such a histogram typically shows the lengths of time during which respective power levels were measured on the channel in question. A collection of such profiles for multiple respective channels provides an overall activity mapping of the frequency band. The mapping may be constructed without interrupting normal operation by the primary TX/RX chains.

In addition to activity mapping, the auxiliary chain can measure the signal per channel using various detectors, in order to identify or classify the received signals. An example detector may comprise a detector for the preamble of the IEEE 802.11 signal. This detector may be implemented, for example, by correlating the received signal with a known sequence, or by auto-correlating the received signal and identifying known periodicity that is present in the preamble signal.

Signal activity evaluation by the auxiliary chain can be used, for example, for reporting channel load and noise histogram, as specified in sections 11.10.8.3 and 11.10.8.4 of IEEE 802.11k-2008, or for initial fast channel scanning after power-up.

Coexistence Between Primary TX/RX Chains and Auxiliary RX Chain

In many practical cases, transmission by primary chains 36A . . . 36D may block or distort signal reception in auxiliary chain 40. For example, signal transmission by the primary chains may saturate LNA 88 in the auxiliary chain. Other distortion or blocking mechanisms are also possible.

The description that follows describes several techniques that can used for enabling coexistence between transmission in the primary chains and reception in the auxiliary chain. Some of these techniques also enable device 20 to meet regulatory requirements, e.g., the Channel Availability Check (CAC) requirement for continuous monitoring of a clear channel for sixty seconds.

Generally speaking, the disclosed techniques define two operational modes—A first operational mode in which priority is given to transmission and reception of the primary TX/RX chains, and a second operational mode in which priority is given to reception in the auxiliary chain.

In some embodiments, control unit 124 deactivates some or all of auxiliary chain 40 during time intervals in which primary chains 36A . . . 36D are transmitting. Unit 124 may deactivate RF any suitable elements of chain 40, and/or corresponding baseband hardware in BBIC 32. Any such deactivation is regarded herein as deactivation or disabling of the auxiliary RX chain. In addition to avoiding reception of distorted signals, the deactivation operation reduces power consumption.

Figure 2:
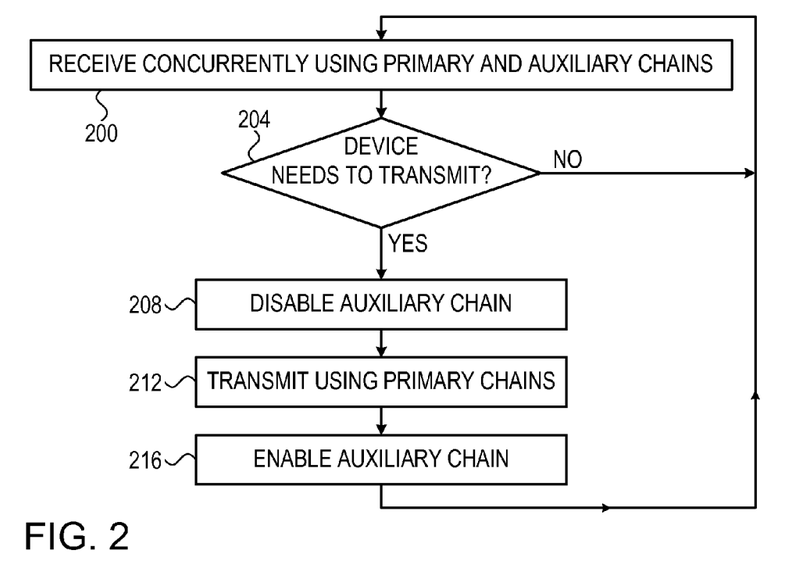
FIGS. 2 and 3 are flow charts that schematically illustrate methods for coexistence between primary Transmit/Receive (TX/RX) chains and an auxiliary reception (RX) chain in a WLAN device, in accordance with embodiments of the present invention.

FIG. 2 is a flow chart that schematically illustrates a method for coexistence between primary Transmit/Receive (TX/RX) chains 36 and auxiliary reception (RX) chain 40 in WLAN device 20, in accordance with an embodiment of the present invention. The method begins with device 20 receiving concurrently using primary TX/RX chains 36A . . . 36D and using auxiliary RX chain 40, at a concurrent reception step 200.

At a transmission checking step 204, control unit 124 checks whether the primary chains are about to transmit. If not, the method loops back to step 200 above. When transmission is about to begin, control unit 124 disables auxiliary RX chain 40, at a disabling step 208. The control unit then controls the primary chains to transmit, at a transmission step 212. Following the transmission, control unit 124 re-activates the auxiliary chain, at a re-activation step 216. The method then loops back to step 200 above.

When operating in accordance with the method of FIG. 2, reception of the auxiliary RX chain is interrupted from time to time in order to allow the primary chains to transmit. As a result, the sixty-second CAC monitoring requirement may not be met. In some embodiments, control unit 124 includes in the sixty-second monitoring time only the net time during which the auxiliary chain actually receives. In other words, control unit 124 excludes the times during which the auxiliary chain was deactivated from the count of the sixty-second period. In this embodiment the end-to-end duration of the CAC measurement is longer than sixty seconds, because the auxiliary chain operates at a partial duty cycle.

In some embodiments, control unit 124 limits the duty cycle at which the primary chains transmit (and thus the duty cycle at which the auxiliary RX chain is deactivated) so as not to exceed some predefined ratio. Such a constraint enables the primary chains to provide service on the primary channel, and at the same time avoids scenarios in which the auxiliary chain cannot evaluate alternative channels for prolonged periods of time.

In an embodiment, control unit 124 reverts to the above duty-cycle limitation upon detecting interference on the primary channel. In this embodiment, if the primary channel if free of interference, the primary chains are permitted to transmit at any duty cycle, without guaranteeing time slots for reception by the auxiliary chain.

In most practical implementations, the isolation between the primary transmitter and the auxiliary receiver changes from one primary chain to another. In other words, the leakage of the transmitted signal from each primary chain to the auxiliary chain may be different. In the example of FIG. 1, highest leakage is expected from the transmitter of primary chain 36D. The severity of leakage from a given primary chain may vary, for example depending of physical circuit layout and antenna geometry. Moreover, when the auxiliary chain is receiving, T/R switch 72 of the fourth chain (in "FRONT END 4") is switched toward the receiver, which also practically prevents simultaneous transmission and reception in the fourth chain.

In some embodiments, control unit 124 supports a mode in which the transmission power of one or more of the primary chains is constrained (and reduced if needed) to a level that permits simultaneous operation of the primary chains and the auxiliary chain. The reduction in transmit power may differ from one primary chain to another, depending on the leakage from each primary chain to the auxiliary chain. This mode may be activated, for example, upon detecting interference on the primary channel. When no interference is present, transmission may remain at full power. When using this mode, the auxiliary chain is able to receive continuously and need not be disabled. As such, the end-to-end CAC period is not prolonged beyond sixty seconds.

Figure 3:
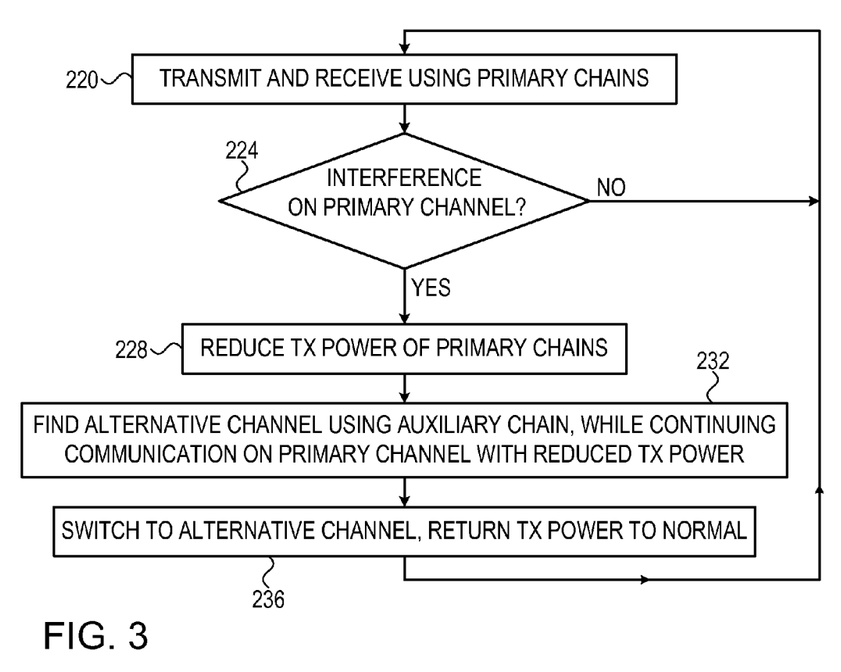

FIG. 3 is a flow chart that schematically illustrates a method for coexistence between primary Transmit/Receive (TX/RX) chains 36 and auxiliary reception (RX) chain 40 in WLAN device 20, in accordance with another embodiment of the present invention. The method begins with device 20 transmitting and receiving normally using the primary TX/RX chains, at a normal operation step 220.

At an interference checking step 224, control unit 124 checks whether interference (e.g., a radar signal) is present on the primary channel. If not, the method loops back to step 220 above. If interference is detected, control unit 124 reduces the transmit power of one or more of the primary TX/RX chains, at a power reduction step 228. This power reduction enables the auxiliary RX chain to evaluate signals on alternative channels with little or no degradation.

At an alternative channel evaluation step 232, control unit 124 uses auxiliary chain 40 to find a suitable (e.g., interference-free) channel to switch to. At a switching step 236, control unit 124 switches the primary TX/RX chains to the newly-found alternative channel, which now becomes the primary channel. The control unit sets the transmit power of the primary TX/RX chains back to normal power, and the method loops back to step 220 above.

Additionally or alternatively, control unit 124 may support a mode in which transmission is performed only via a predefined subset of the primary chains that can coexist with the auxiliary chain. Typically, transmission is performed only via the subset of the primary chains whose signals do not saturate the receiver of the fourth chain. Reception in this mode may still be performed using all primary chains.

This mode too may be activated, for example, upon detecting interference on the primary channel. When no interference is present, transmission may be performed from all primary chains. This mode too does not prolong the end-to-end CAC period beyond sixty seconds, since the auxiliary chain need not be deactivated.

Assume, for example, that the signal leakage in device 20 of FIG. 1 is such that three primary chains (36A . . . 36C) are able to coexist with auxiliary chain 40. In other words, auxiliary chain 40 is able to evaluate alternative channels simultaneously with transmission of chains 36A . . . 36C, e.g., without saturating the auxiliary chain receiver. In some embodiments, control unit 124 may transmit only from primary chains 36A . . . 36C (and not from 36D). In parallel, the control unit evaluates alternative channels using auxiliary RX chain 40. Reception on the primary channel is performed normally, using all four chains 36A . . . 36D.

The above mode can be implemented in several ways. For example, control unit 124 may configure device 20 to constantly transmit via only three primary chains (36A . . . 36C) and receive via all four primary chains (36A . . . 36D). In this embodiment, as soon as interference appears on the primary channel, it is assured that the auxiliary chain had sufficient time (at least sixty seconds) to perform CAC measurements on an alternative channel. Assuming the CAC measurements concluded that the alternative channel is clear, switching to the alternative channel can be immediate.

In another implementation, device 20 operates normally with both transmission and reception via all four primary chains (36A . . . 36D). Upon detecting interference on the primary channel, control unit 124 reverts to transmit via only three primary chains (36A . . . 36C), possibly with reduced transmit power. Concurrently with transmission via chains 36A . . . 36C, auxiliary chain 40 is able to evaluate an alternative channel for at least sixty seconds. These mode switches can be performed seamlessly, without disrupting traffic on the primary channel.

In the description above, it is assumed that auxiliary chain 40 monitors the interference conditions on the alternative channel being evaluated, e.g., by detecting signal energy. The alternative channel being evaluated is a candidate channel to switch to, in case of interference detection on the primary channel or for any other reason. If the auxiliary channel detects interference on the alternative channel being evaluated, it will typically jump to evaluate a different alternative channel.

Note that the technique above can also be implemented without a dedicated auxiliary RX chain. In other words, one of the primary TX/RX chains may serve as the auxiliary chain, provided that device 20 comprises a separate synthesizer for tuning this primary chain to other channels. In such an embodiment, the WLAN device would normally operate with transmission and reception via four chains. Upon detecting interference, the device would revert to transmission and reception via three chains, and in parallel evaluate alternative channels using the fourth chain.

The techniques described above are example techniques that were chosen purely for the sake of conceptual clarity. In alternative embodiments, device 20 may employ any other suitable solution for coexistence between transmission of the primary chains and reception of the auxiliary chain.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a Wireless Local Area Network (WLAN) device, which includes (i) at least one antenna, (ii) one or more primary transmission/reception (TX/RX) chains and (iii) an auxiliary reception (RX) chain that shares a common antenna and a common Low-Noise Amplifier (LNA) with a primary TX/RX chain designated from among the primary TX/RX chains, defining a first operational mode in which priority is given to transmission of the primary TX/RX chains, and a second operational mode in which the priority is given to reception of the auxiliary RX chain; and
while operating the WLAN device alternately in the first and second operational modes:
tuning the primary TX/RX chains to a given communication channel having a first channel frequency; and
tuning the auxiliary RX chain to one or more alternative communication channels having second channel frequencies that are different from the first channel frequency
setting a gain of the common LNA, by:
checking whether signals are received in both the auxiliary RX chain and the primary TX/RX chain, or whether a signal is received in only one of the auxiliary RX chain and the primary TX/RX chain;
when the signals are received in both the auxiliary RX chain and the primary TX/RX chain, setting the gain of the common LNA either based on a first signal received via the common LNA by the primary TX/RX chain on the given communication channel, or based on a second signal received via the common LNA by the auxiliary RX chain on the one or more alternative communication channels;
otherwise, when the signal is received only in the auxiliary RX chain and not in the primary TX/RX chain, setting the gain of the common LNA based on the signal received in the auxiliary RX chain; and
otherwise, when the signal is received only in the primary TX/RX chain and not in the auxiliary RX chain, setting the gain of the common LNA based on the signal received in the primary TX/RX chain; and
after setting the gain of the common LNA, communicating via the common LNA on the given communication channel using the one or more primary TX/RX chains, and concurrently evaluating signal activity via the common LNA and the common antenna on the one or more alternative communication channels using the auxiliary RX chain.

2. The method according to claim 1, wherein communicating using the primary TX/RX chains comprises alternating between transmission and reception in the primary TX/RX chains in any of the first and second operational modes.

3. The method according to claim 1, wherein operating in the first operational mode comprises deactivating at least part of the auxiliary RX chain during transmission of the primary TX/RX chains.

4. The method according to claim 1, wherein operating in the second operational mode comprises limiting a duty cycle of the transmission of the primary TX/RX chains so as not to exceed a predefined ratio.

5. The method according to claim 1, wherein operating in the second operational mode comprises transmitting using only a partial subset of the primary TX/RX chains that are able to coexist with reception of the auxiliary RX chain.

6. The method according to claim 1, wherein operating in the second operational mode comprises constraining a transmission power of at least one of the primary TX/RX chains to a level that permits coexistence with reception of the auxiliary RX chain.

7. The method according to claim 1, and comprising operating in the first operational mode as long as no interference is detected, and switching to the second operational mode in response to detecting the interference.

8. The method according to claim 1, wherein evaluating the signal activity comprises verifying whether radar signals are present on the alternative communication channels.

9. The method according to claim 1, wherein evaluating the signal activity comprises carrying out an off-channel Channel Availability Check (CAC) or In-Service Monitoring (ISM) process.

10. The method according to claim 9, wherein carrying out the CAC or ISM process comprises monitoring a given alternative channel for at least a specified time period, and comprising excluding time periods during which the auxiliary RX chain is deactivated from a count of the specified time period.

11. The method according to claim 1, wherein evaluating the signal activity comprises collecting respective statistical data that characterize an extent of the signal activity on one or more of the alternative communication channels.

12. The method according to claim 1, wherein evaluating the signal activity comprises assessing respective signal duty-cycles on the alternative communication channels.

13. A Wireless Local Area Network (WLAN) device, comprising:
at least one antenna;
one or more primary transmission/reception (TX/RX) chains;
an auxiliary reception (RX) chain, which shares a common antenna and a common Low-Noise Amplifier (LNA) with a primary TX/RX chain designated from among the primary TX/RX chains; and
a control unit, which is configured to:
tune the primary TX/RX chains to a given communication channel having a first channel frequency, and tune the auxiliary RX chain to one or more alternative communication channels having second channel frequencies that are different from the first channel frequency, while operating alternately in a first operational mode in which priority is given to transmission of the primary TX/RX chains, and in a second operational mode in which the priority is given to reception of the auxiliary RX chain,
wherein the control unit is further configured to set a gain of the common LNA, by:
checking whether signals are received in both the auxiliary RX chain and the primary TX/RX chain, or whether a signal is received in only one of the auxiliary RX chain and the primary TX/RX chain;
when the signals are received in both the auxiliary RX chain and the primary TX/RX chain, setting the gain of the common LNA either based on a first signal received via the common LNA by the primary TX/RX chain on the given communication channel, or based on a second signal received via the common LNA by the auxiliary RX chain on the one or more alternative communication channels;
otherwise, when the signal is received only in the auxiliary RX chain and not in the primary TX/RX chain, setting the gain of the common LNA based on the signal received in the auxiliary RX chain; and otherwise, when the signal is received only in the primary TX/RX chain and not in the auxiliary RX chain, setting the gain of the common LNA based on the signal received in the primary TX/RX chain; and after setting the gain of the common LNA, communicate via the common LNA on the given communication channel using the one or more primary TX/RX chains, and concurrently evaluate signal activity via the common LNA and the common antenna on the one or more alternative communication channels using the auxiliary RX chain.

14. The device according to claim 13, wherein the control unit is configured to alternate between transmission and reception in the primary TX/RX chains in any of the first and second operational modes.

15. The device according to claim 13, wherein, when operating in the first operational mode, the control unit is configured to deactivate at least part of the auxiliary RX chain during transmission of the primary TX/RX chains.

16. The device according to claim 13, wherein, when operating in the second operational mode, the control unit is configured to limit a duty cycle of the transmission of the primary TX/RX chains so as not to exceed a predefined ratio.

17. The device according to claim 13, wherein, when operating in the second operational mode, the control unit is configured to transmit using only a partial subset of the primary TX/RX chains that are able to coexist with reception of the auxiliary RX chain.

18. The device according to claim 13, wherein, when operating in the second operational mode, the control unit is configured to constrain a transmission power of at least one of the primary TX/RX chains to a level that permits coexistence with reception of the auxiliary RX chain.

19. The device according to claim 13, wherein the control unit is configured to operate in the first operational mode as long as no interference is detected, and to switch to the second operational mode in response to detecting the interference.

20. The device according to claim 13, wherein the control unit is configured to evaluate the signal activity by verifying whether radar signals are present on the alternative communication channels.

21. The device according to claim 13, wherein the control unit is configured to evaluate the signal activity by carrying out an off-channel Channel Availability Check (CAC) or In-Service Monitoring (ISM) process.

22. The device according to claim 21, wherein the control unit is configured to carry out the CAC or ISM process by monitoring a given alternative channel for at least a specified time period, and excluding time periods during which the auxiliary RX chain is deactivated from a count of the specified time period.

23. The device according to claim 13, wherein the control unit is configured to evaluate the signal activity by collecting respective statistical data that characterize an extent of the signal activity on one or more of the alternative communication channels.

24. The device according to claim 13, wherein the control unit is configured to evaluate the signal activity by assessing respective signal duty-cycles on the alternative communication channels.

\* \* \* \* \*